United States Patent [19]

Yook

[11] Patent Number: 4,901,156
[45] Date of Patent: Feb. 13, 1990

[54] AUTOMATIC BRIGHTNESS LIMITING CIRCUIT

[75] Inventor: Keun J. Yook, Kyeongsangbook-do, Rep. of Korea

[73] Assignee: Goldstart Co., Ltd., Seoul, Rep. of Korea

[21] Appl. No.: 137,068

[22] Filed: Dec. 23, 1987

[30] Foreign Application Priority Data

Dec. 26, 1986 [KR] Rep. of Korea ............... 21306/1986

[51] Int. Cl.$^4$ .............................................. H04N 3/18
[52] U.S. Cl. .................................... 358/243; 358/168; 315/411
[58] Field of Search ................... 358/168, 243, 74; 315/386, 411; 363/20, 21

[56] References Cited

U.S. PATENT DOCUMENTS

| | | | |
|---|---|---|---|
| 3,745,246 | 7/1973 | Kashiwagi | 315/411 X |
| 3,842,201 | 10/1974 | Ghaem-Maghami et al. | 358/243 |
| 3,873,767 | 3/1975 | Okada et al. | 358/168 |
| 4,218,720 | 8/1980 | Kam et al. | 358/74 X |
| 4,321,513 | 3/1982 | Knight | 358/243 |
| 4,531,181 | 7/1985 | Herz et al. | 363/21 |

FOREIGN PATENT DOCUMENTS 57-63968  4/1982  Japan .................................. 315/411

Primary Examiner—James J. Groody
Assistant Examiner—Mark R. Powell
Attorney, Agent, or Firm—Birch, Stewart, Kolasch & Birch

[57] ABSTRACT

An automatic brightness limiting (ABL) circuit is provided for preventing the color dispersion of a displayed picture which is caused by an excessive beam current flowing through a color picture tube. The variation of the beam current is detected at the lower terminal of the serial resistor circuit of the high voltage output stage of a flyback transformer that is included in the high voltage output section. The detected beam current variation is amplified and, in turn, supplied to a color output section as a control voltage through a brightness adjusting section.

2 Claims, 3 Drawing Sheets

AUTOMATIC BRIGHTNESS LIMITING CIRCUIT

BACKGROUND OF THE INVENTION

1. Field of the Invention

The present invention relates generally to an automatic brightness limiting (ABL) circuit for preventing the color dispersion of a displayed picture, which is caused by an excessive beam current flowing through a CRT (Cathode-Ray Tube). The circuit may be used, for instance, in a picture tube of a television receiver. More particularly, the present invention relates to an improvement to a response characteristic of such an automatic brightness limiting circuit.

2. Description of the Prior Art

In a conventional prior art automatic brightness limiting circuit as shown in FIG. 1, a DC voltage B+ is supplied to one terminal of the primary coil of a flyback transformer FBT and horizontal synchronization pulses HS from a horizontal output section 11 of a conventional horizontal deflection circuit is applied to the other terminal of the primary coil of the flyback transformer FBT. Then, a high voltage is induced at the secondary coil of the flyback transformer FBT. As a result, a high voltage output HV for driving a color picture tube, a focus control voltage FV and a screen control voltage SV are drawn from a conventionl high voltage output section 10 which includes the flyback transformer FBT.

In such a conventional automatic brightness limiting circuit, if an input image signal to a color output section 13 is increased, a beam current flowing in the color picture tube is also increased. At this time, the variation of the beam current is detected at a coupling point between resistors $R_1$ and $R_2$, which is coupled to the lower terminal of the secondary coil of the flyback transformer FBT. Specifically, the current flowing through the resistor $R_1$ which is connected to a DC voltage source B+ is divided and supplied to the lower terminal of the secondary coil of the flyback transformer FBT and the resistor $R_2$. Then, the current supplied to the resistor $R_2$ is applied to a brightness adjusting section 12 through smoothing capacitors $C_1$ and $C_2$ and a rectifying diode $D_1$. The output voltage from the brightness adjusting section 12 is, in turn, supplied to the control input port of the color output section 13 as a control voltage.

When the beam current flowing in the color picture tube is increased, the voltage drop across the resistor $R_1$ is also increased. This voltage drop causes the input voltage to the brightness adjusting section 12 to be decreased. Then, the beam current can also be decreased, since the amount of the input image signal to the color output section 13 is reduced.

However, in such a prior art automatic brightness limiting circuit, there is a problem because the response characteristic of the circuit is very slow due to large constant values of the smoothing capacitors $C_1$ and $C_2$. Therefore, such a prior art circuit is inapplicable to the CRT apparatus which require a high speed response characteristics and deteriorates the resolution of a displayed picture.

SUMMARY OF THE INVENTION

Accordingly, it is an object of the invention to improve the response characteristics of an automatic brightness limiting circuit and hence the quality and reliability of a CRT apparatus will be improved.

In a preferred embodiment of the invention, the variation of a beam current is detected at the lower terminal of a serial resistor circuit in a high voltage output section for drawing a focus control voltage and a screen control voltage, which has been usually grounded in a prior art automatic brightness limiting circuit. The detected beam current variation is them amplified and supplied to a brightness adjusting section so that the input image signal to the color output section can be adjusted by an amount of the variation of the beam current.

The above and other objects and features of the present invention will become more apparent from the following detailed description taken in conjunction with the accompanying drawings.

BRIEF DESCRIPTION OF THE DRAWINGS

The present invention will become more fully understood from the detailed description given hereinbelow and the accompanying drawings which are given by way of illustration only, and thus, are not limitative of the present invention and wherein.

the accompanying drawings.

DETAILED DESCRIPTION OF THE INVENTION

Figure 2:
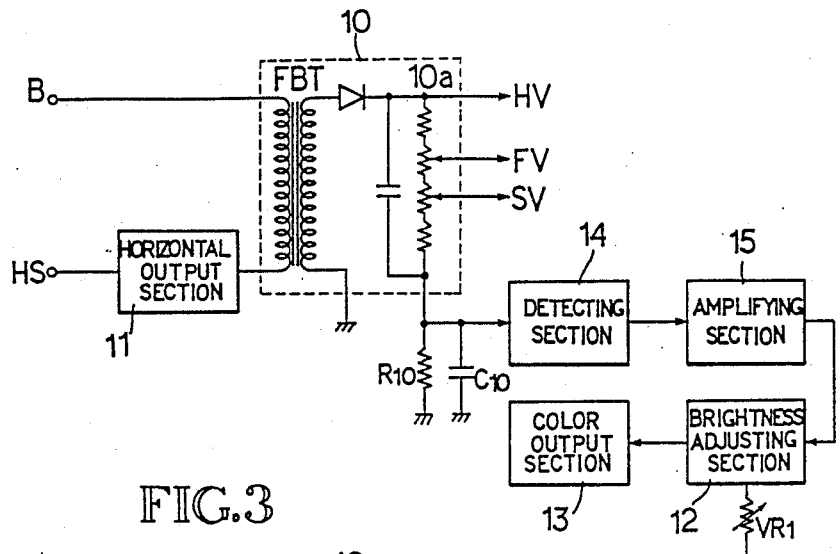
FIG. 2 is a simplified schematic circuit diagram of a preferred embodiment of the invention.

Referring now to FIG. 2, the lower terminal of a serial resistor circuit 10a in a high voltage output section 10 for drawing a focus control voltage FV and a screen control voltage SV, which has been usually grounded in a prior art automatic brightness limiting circuit, is coupled to a detecting section 14 via a resistor $R_{10}$ and a capacitor $C_{10}$. The output from the detecting section 14 is amplified through an amplifying section 15 and then supplied to a brightness adjusting section 12. The output from the brightness adjusting section 12 is applied to a color output section 13 as a control voltage.

Figure 3:
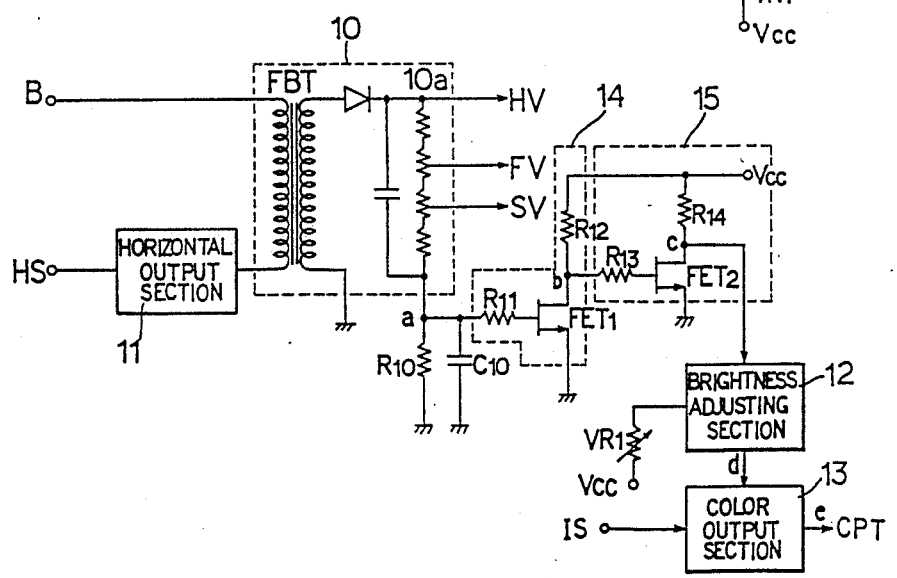
FIG. 3 is a more detailed circuit diagram of FIG. 2.

More specifically, referring to FIG. 3, the detecting section 14 includes a first field effect transistor FET 1 and resistors $R_{11}$ and $R_{12}$. The gate of the first field effect transistor FET 1 is connected to the point a via the resistor $R_{11}$. Also, the lower terminal of the serial resistor circuit 10a, the resistor $R_{10}$ and the capacitor $C_{10}$ are commonly coupled to the point a. The drain of the first field effect transistor FET 1 is connected to a supply voltage source Vcc via the resistor $R_{12}$.

As further shown in FIG. 3, the amplifying section 15 includes a second field effect transistor FET 2 and resistors $R_{13}$ and $R_{14}$. The gate of the second field effect transistor FET 2 is coupled to the point b via the resistor $R_{13}$. Also, the drain of the first field effect transistor FET 1 and the resistor $R_{12}$ are commonly connected to the point b. The drain of the second field effect transistor FET 2 is coupled to the supply voltage source Vcc via the resistor $R_{14}$. The output port of this amplifying section 15, that is, the point c to which the drain of the second field effect transistor FET 2 and the resistor $R_{14}$ are commonly coupled, is connected to the input port of the conventional brightness adjusting section 12. A variable resistor $VR_1$ is used for adjusting the brightness.

Figure 1:
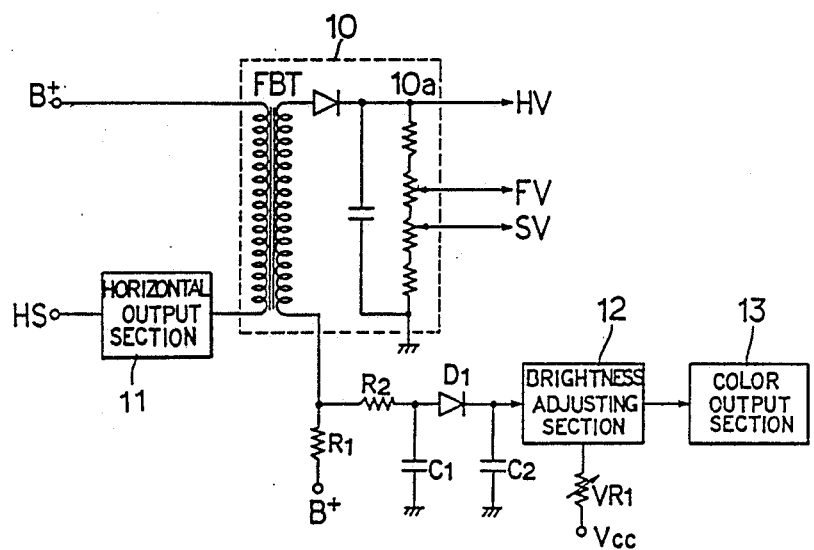
FIG. 1 is a simplified schematic circuit diagram of a prior art automatic brightness limiting circuit.

In the circuit of FIG. 2 constructed as mentioned above, when a DC voltage B+ and, at the same time, horizontal synchronization pulses HS from a horizontal output section 11 of a conventional horizontal deflection circuit are supplied to the primary coil of a flyback transformer FBT in a high voltage output section 10, high voltage pulses are generated from the upper terminal of the secondary coil of the flyback transformer FBT. As shown in FIG. 2, the lower terminal of the secondary coil of the flyback transformer FBT is grounded. In contrast, the lower terminal of the secondary coil is grounded in the conventional high voltage output section employed in a prior art automatic brightness limiting circuit. In the prior art automatic brightness limiting circuit the lower terminal of the secondary coil of the flyback transformer employed in the high voltage output section is coupled to a beam current variation detecting circuit, as shown in FIG. 1. However, the beam current variation detecting circuit 14 employed in the preferred embodiment of the invention is coupled to the lower terminal of the serial resistor circuit $10a$. In the prior art automatic brightness limiting circuit the lower terminal of the serial resistor circuit is grounded as shown in FIG. 1.

The high voltage pulses generated from the upper terminal of the secondary coil of the flyback transformer FBT are rectified through a high voltage rectifying diode to produce a high voltage output HV which will then be supplied to an anode of a CRT as a driving voltage. As the high voltage HV is induced at the upper terminal of the internal serial resistor circuit $10a$, a focus control voltage FV and a screen control voltage SV are produced from the inter-tabs of the serial resistor circuit $10a$. At the same time, a constant voltage output generated from the lower terminal of the serial resistor circuit $10a$ is induced at the point a to which the resistor $R_{10}$ and the capacitor $C_{10}$ are commonly coupled. This constant output voltage is detected at the detecting section 14. The detected voltage is then amplified through the amplifying section 15 and is, in turn, supplied to the brightness adjusting section 12. Specifically, when the beam current flowing in the color picture tube is maintained at the constant level as shown in FIG. 4A, the output voltage obtained from the coupling point a of the resistor $R_{10}$ and the capacitor $C_{10}$ is also maintained at the constant level as shown in FIG. 4B.

Figure 4:
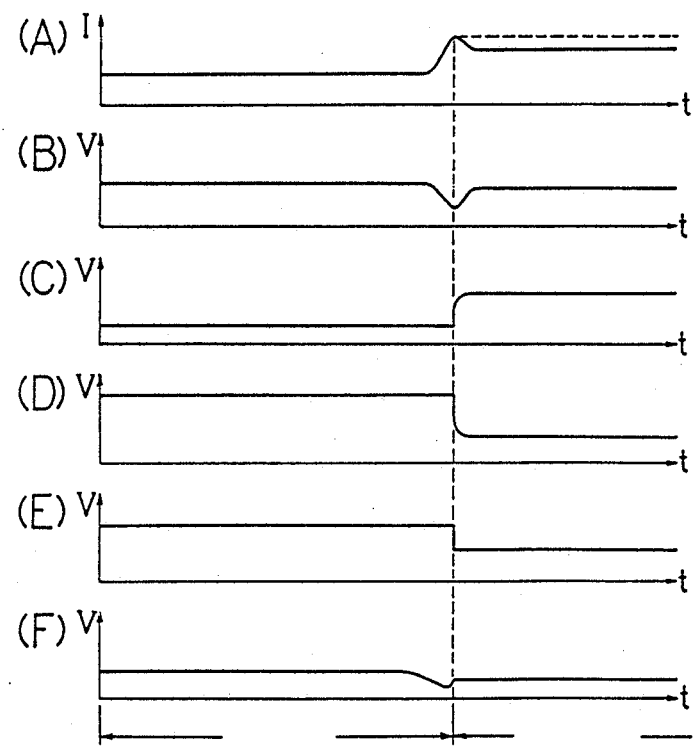
FIG. 4 is a view which shows the waveforms used to explain the operation of the circuit of FIG. 3.

However, when the beam current in the color picture tube is raised above the automatic brightness limiting (ABL) level as shown in FIG. 4(A), the high voltage output HV from the flyback transformer FBT is reduced. This causes the voltage obtained from the coupling point a to be reduced as shown in FIG. 4(B), and the voltage applied to the gate of the first field effect transistor FET 1 is reduced. Because the first field effect transistor FET 1 is voltage controlled rather than current controlled, the current flowing through the resistor $R_{11}$ approaches 0 mA.

As described above, since the voltage applied to the gate of the first field effect transistor FET 1 is reduced, the output voltage obtained from its drain will be raised as shown in FIG. 4(C), and this output will then be supplied to the gate of the second field effect transistor FET 2 through the resistor $R_{13}$ of the amplifying section 15. Accordingly, the output voltage from the drain of the second field effect transistor FET 2 is reduced as shown in FIG. 4(D) and this output is applied to the input port of the brightness adjusting section 12.

Therefore, the output voltage from the brightness adjusting section 12 is reduced in proportion to the variation of the beam current as shown in FIG. 4(E), and this output will then be supplied to color output section 13 as a control voltage. At this time, the color amount being generated from the color output section 13 to which has an image signal IS being applied will decrease as shown in FIG. 4(F) and the color signal will then be supplied to the color picture tube so that the beam current may be compensated.

In the preferred embodiment explained as above, because the capacitor $C_{10}$ used as a smoothing capacitor is connected to the output stage of the high voltage HV output section the capacitor $C_{10}$ may be selected of a small value. Accordingly, the response characteristics of the automatic brightness limiting circuit of this invention will be improved, and the high quality and reliability of the CRT apparatus can be achieved.

Although only one embodiment of the invention has been described, it will be apparent to those skilled in the art that other embodiments and modifications of this invention are possible without departing from the spirit and scope of the present invention as claimed.

What is claimed is:

1. An automatic brightness limiting circuit for preventing color dispersion of a display signal caused by an excessive beam current flowing through a color picture tube comprising:

output signal means for developing a focus control signal, a screen control signal, a high output signal and a constant output signal in response to input signals, said output signal means including, flyback transforming means for developing said high output signal in response to said input signals, a serial resistor circuit connected to said high output signal for developing said focus control signal from a first terminal, said screen control signal from a second terminal and said constant output signal from a third terminal of said serial resistor circuit, and an RC circuit connected to said output of said serial resistor circuit;

detecting means for detecting said constant output signal, said detecting means including a first field effect transistor and first and second resistors;

amplifying means for developing an amplified signal of said constant output signal detected by said detecting means, said amplifying means including a second field effect transistor and third and fourth resistors;

brightness adjusting means connected to said amplifying means for developing a control signal; and color output means for developing the display signal in response to said control signal, said control signal compensating for the excessive beam current and preventing color dispersion of the display signal.

2. An automatic brightness limiting circuit according to claim 1, wherein said RC circuit comprises a fifth resistor and a smoothing capacitor connected in parallel.

* * * * *